US008537271B2

(12) United States Patent
Tsai

(10) Patent No.: US 8,537,271 B2
(45) Date of Patent: Sep. 17, 2013

(54) MECHANICAL CAMERA SHUTTER MECHANISM

(75) Inventor: Richard Tsai, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 338 days.

(21) Appl. No.: 12/892,821

(22) Filed: Sep. 28, 2010

(65) Prior Publication Data

US 2012/0075521 A1   Mar. 29, 2012

(51) Int. Cl.
H04N 5/238 (2006.01)
G03B 9/38 (2006.01)
G03B 9/40 (2006.01)

(52) U.S. Cl.
USPC ............................. 348/367; 396/491; 396/489

(58) Field of Classification Search
None
See application file for complete search history.

(56) References Cited

U.S. PATENT DOCUMENTS

| | | | |
|---|---|---|---|
| 3,099,196 | A | 7/1963 | Neubert |
| 3,635,141 | A | 1/1972 | Starp et al. |
| 3,820,143 | A | 6/1974 | Keiner |
| 4,012,750 | A | 3/1977 | Rentschler |
| 4,051,499 | A * | 9/1977 | Kondo ............................. 396/464 |
| 5,617,159 | A | 4/1997 | Sakagami et al. |
| 6,027,261 | A | 2/2000 | Naganuma |
| 6,536,962 | B2 * | 3/2003 | Takahashi ........................ 396/466 |
| 7,316,514 | B2 * | 1/2008 | Naganuma ....................... 396/450 |
| 7,670,069 | B2 | 3/2010 | Suzuki et al. |
| 7,762,732 | B2 * | 7/2010 | Numnual et al. ............... 396/489 |
| 2010/0046939 | A1 | 2/2010 | Masuzawa et al. |
| 2010/1007461 | | 3/2010 | Numnual et al. |

FOREIGN PATENT DOCUMENTS

| | | |
|---|---|---|
| JP | 2008089742 | 4/2008 |
| JP | 2008176171 | 7/2008 |

OTHER PUBLICATIONS

"DSS1—Shutter Series Specifications", UNIBLITZ®, Electro-Programmable Shutter Systems, Updated Apr. 2009, pp. 1-2.
"Focal-plane shutter", Wikipedia, "http://en.wikipedia.org/wiki/Focal-plane_shutter" downloaded on Aug. 2, 2010, pp. 1-14.

* cited by examiner

Primary Examiner — Luong T Nguyen
(74) Attorney, Agent, or Firm — Jennifer Luh

(57) ABSTRACT

A camera shutter mechanism for covering and exposing an imaging sensor array is disclosed. The camera shutter mechanism includes a rotary motor, a crank mechanism, a cover, a guide, and a drive circuit. The rotary motor is coupled to the crank mechanism to rotate the crank mechanism about a central axis. The cover is coupled to the crank mechanism at a point away from the central axis. The drive circuit controls the rotary motor so that the cover moves back and forth repeatedly in a substantially linear motion along the guide between a shutter closed position and a shutter open position over the imaging sensor array. Other embodiments are also described and claimed.

20 Claims, 6 Drawing Sheets

MECHANICAL CAMERA SHUTTER MECHANISM

An embodiment of the invention relates to a digital video camera having a mechanical shutter. Other embodiments are also described and claimed.

BACKGROUND

A mechanical shutter may be used in a digital, low cost, consumer electronic camera to control how long a complementary metal oxide semiconductor (CMOS) imaging sensor array of the camera is allowed to respond to light from a scene to capture a still image. When the shutter is open, light is allowed to accumulate on the sensor. The sensor is "exposed" during the time from deassertion of a reset signal (which electronically resets the sensors of the array), to the mechanical closing of the shutter (which physically covers the array). The length of time that the shutter remains open (from the deassertion of the reset signal) determines the length of time or exposure time during which photodetected charge can accumulate in the sensor. The shutter is closed after the time necessary for an exposure has elapsed. When the shutter is closed, it blocks the light from reaching the sensor. After the shutter closes, circuitry inside the camera moves an image (data) captured by the sensor to a storage area.

In contrast, modern, consumer electronic video cameras do not use a mechanical shutter but instead rely solely on the reset signal and a readout signal to end the exposure by electronically stopping or reading out the accumulation of photo-charge, to achieve a rapid sequence of exposures or frames. Typically, an electronic rolling shutter mechanism is used which "exposes" the CMOS sensor one row at a time (rather than all at once). This however can induce smearing artifacts into the capture of video (due to the fast movement in the scene).

SUMMARY

A camera shutter mechanism for controlling exposure of an imaging sensor array during still or video capture is described. The shutter mechanism includes a cover that has an area at least as large as the imaging sensor array so as to completely cover the imaging sensor array when the shutter is in the closed position to block light from falling on the sensor. The cover moves back and forth repeatedly in a substantially linear motion between a shutter closed position and a shutter open position over the sensor array. The cover may be supported by a guide that restricts the cover to the linear motion. The cover may be moved back and forth by a crank mechanism driven by a rotary motor. The rotary motor may be connected to the center of the crank mechanism so that the crank mechanism is rotated in one direction by the rotary motor about the central axis of the crank mechanism. The crank mechanism may be connected to the cover by a pivoting connecting arm, so that as the crank mechanism rotates, the rotational motion of the crank mechanism is translated to a linear reciprocating motion by the pivoting connecting arm that moves the cover back and forth along the guide.

The movement of the cover may be controlled by a drive circuit. The drive circuit controls the rotary motor and may power the rotary motor to rotate continuously in just one direction, so that the cover moves back and forth repeatedly between the closed and open shutter positions thereby continuously covering and exposing the sensor array. The drive circuit may also control the speed at which the rotary motor rotates. The speed of the rotation determines the frame rate at which video is captured by the sensor array. A camera controller synchronizes the readout of the sensor array with the control of the rotary motor by the drive circuit, so that signals produced by photocells of the image sensor array may be read out while those photocells are covered, to produce a video of the scene.

The camera shutter mechanism may better control the volume of any acoustic noise produced, by maintaining continuous fixed speed operation of the rotary motor. This may also allow for easier removal (through audio signal processing or filtering) of the acoustic noise that has been picked up by a local microphone.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

Embodiments of the invention will now be described with reference to the drawings summarized below. The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. Whenever the shapes, relative positions, and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
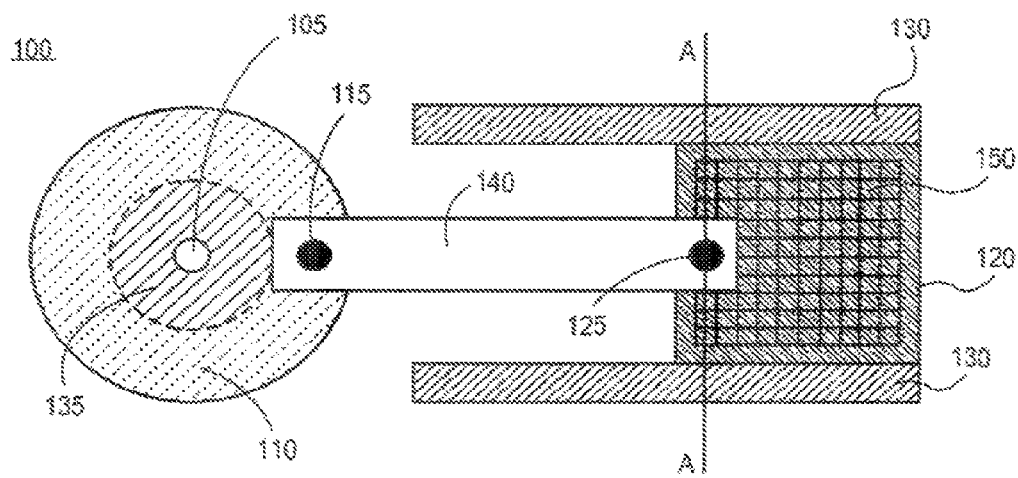
FIG. 1 is a top view of a camera shutter mechanism according to an embodiment.
Figure 2:
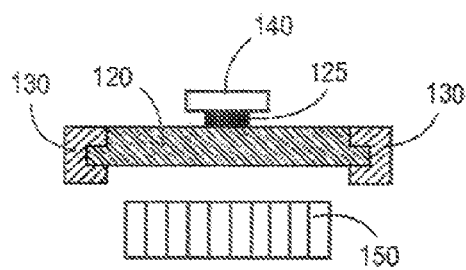
FIG. 2 is a cross-sectional view of the camera shutter mechanism of FIG. 1 taken along line A.
Figure 3:
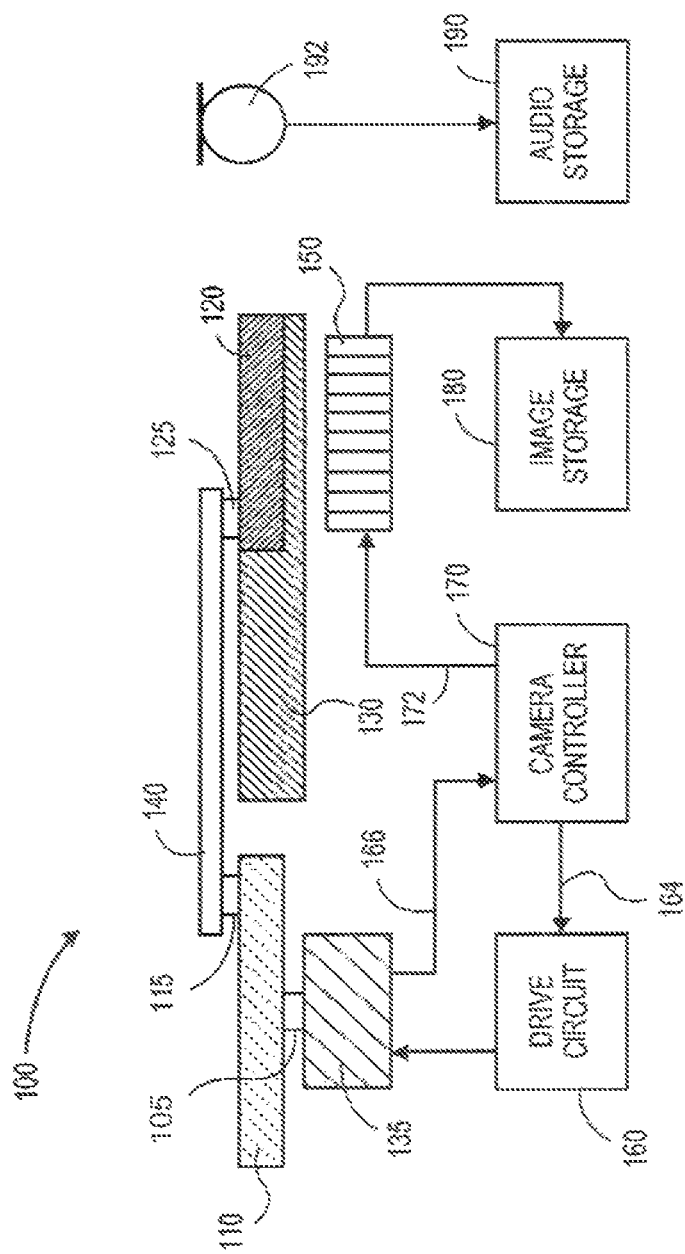
FIG. 3 is a side view and block diagram of the camera shutter mechanism of FIG. 1.

Referring to FIG. 1 through FIG. 3, a shutter mechanism 100 according to an embodiment is shown. FIG. 1 is a top view of the shutter mechanism 100. FIG. 2 is a cross-sectional view of the shutter mechanism 100 of FIG. 1 taken along line A. FIG. 3 is a side view and a block diagram of the shutter mechanism 100 of FIG. 1. The shutter mechanism 100 may include a rotary motor 135, a crank disk 110, a connecting arm or rod 140, a cover 120, and a guide 130.

The rotary motor 135 may be a DC motor with a rotating shaft 105. The shaft 105 may be connected to the center of the crank disk 110 so that the crank disk 110 is rotated by the motor 135 about a central axis of the crank disk 110. Alternatively, the crank disk may be connected to the rotary motor by a gearbox with a given gear ratio. The crank disk 110 may be coupled to the cover 120 at a point away from the central axis of the crank disk 110. The crank disk 110 may be coupled to the cover 120 by the connecting arm 140 that extends from an off center point on the crank disk 110 as shown, to a near point on the cover 120. The connecting arm 140 can thus translate the rotary motion of the crank disk 110 (about the central axis) into a reciprocating or back and forth linear motion of the cover 120.

The crank disk 110 may be directly connected to the connecting arm 140 by a first pivot pin 115. The first pivot pin 115 may be mounted on the top surface (or alternatively the bottom surface) of the crank disk 110 offset from the center axis (e.g., near the edge as shown) and connected to the connecting arm 140 through a hole on one end of the connecting arm 140. The first pivot pin 115 allows the connecting arm 140 to pivot about the first pivot pin 115 as the crank disk 110 rotates, while the connected end of the arm 140 remains at a fixed distance from the face of the crank disk 110.

The connecting arm 140 may be connected to the cover 120 by a second pivot pin 125. The second pivot pin 125 may be mounted on the top surface (or alternatively the bottom surface) of the cover 120 near one edge as shown and connected to the connecting arm 140 through a hole in the connecting arm 140 at the end opposite from the first pivot pin 115. The second pivot pin 125 allows the connecting arm 140 to pivot about the second pivot pin 125 as the cover 120 moves back and forth in a substantially linear motion, while the connected end of the arm 140 remains at a fixed distance from the face of the cover 120.

The cover 120 may be supported by a guide 130. The guide 130 prevents the cover 120 from contacting an imaging sensor array 150 that is positioned under the cover 120, and restricts the movement of the cover 120 to a substantially linear motion and in a single plane, between the shutter closed position and the shutter open position. The imaging sensor array 150 may be positioned and fixed substantially parallel to the guide 130. The guide 130 may have a pair of tracks as shown in FIG. 3 in which the opposite ends of the cover 120 are slidably fitted, such that the cover 120 easily moves back and forth along the tracks, to cover and expose the imaging sensor array 150. The guide 130 may be just in front of the imaging sensor array 150 as in a focal plane type of shutter, or it may be further outward within a removable, camera lens assembly.

FIG. 1 and FIG. 3 show the shutter mechanism 100 in a fully closed position. The cover 120 has a face area at least as large as that of the imaging sensor array 150 so as to completely or fully cover the imaging sensor array 150 when the cover 120 is in the closed position. The cover 120 may be a blade-type, flat single piece of a suitably light and opaque material, such as metal (e.g., aluminum) or carbon fiber (e.g., Kevlar), so as to block all light from reaching the imaging sensor array 150 when the cover 120 is in the closed position. The cover 120 is furthest away from the crank disk 110 in the shutter closed position.

Figure 4:
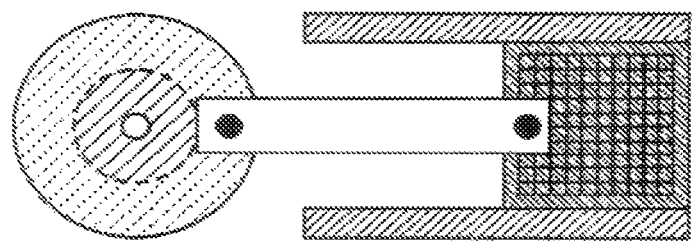
FIGS. 4-7 are a sequence of figures showing the movement of the shutter mechanism of FIG. 1.
Figure 5:
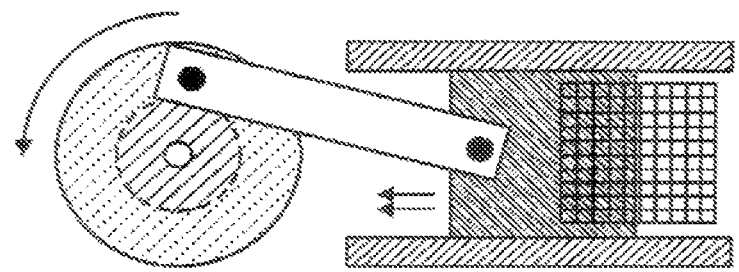
Figure 6:
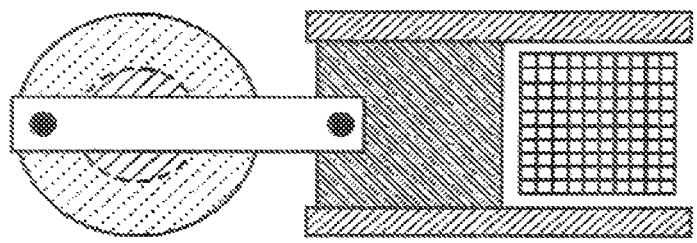
Figure 7:
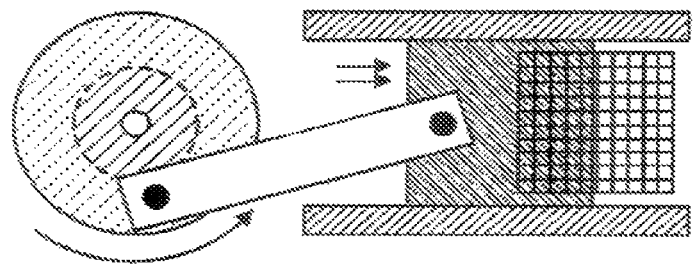

FIG. 4 through FIG. 7 depict the movement of the shutter mechanism. The crank disk rotates in one direction (in this example, counter-clockwise). As the crank disk rotates, the first pivot pin may travel along a circle at a fixed radius about the central axis of the crank disk. The angular displacement of the first pivot pin is translated by the connecting arm to pull the cover in a substantially linear motion along the guide towards the crank disk to expose the imaging sensor array, as shown in FIG. 5. The crank disk then continues to rotate and hence the connecting arm continues to pull the cover toward the crank disk to completely expose the imaging sensor array, as shown in FIG. 6. In this fully open position, the imaging sensor array is completely exposed to allow it to accumulate light. The cover is closest to the crank disk in the shutter open position. As the disk then continues to rotate (the first pivot pin continues to travel in the same direction at the fixed radius about the central axis of the crank disk), the angular displacement of the first pivot pin is translated by the connecting arm to now push the cover (in a substantially linear motion along the guide) away from the crank disk to cover the imaging sensor array, as shown in FIG. 7. The crank disk then continues to rotate and the connecting arm continues to push the cover away from the crank disk to completely cover the imaging sensor array, resuming the original state shown in FIG. 4. The above motion of the cover then repeats (with continued rotation of the disk), to alternately expose and then cover the sensor array at a rate determined by the rotation speed of the motor.

The radius from the central axis of the crank disk at which the first pivot pin travels and the length of the connecting arm are such that the cover completely covers the imaging sensor array in the shutter closed position, as shown in FIG. 4, and completely exposes the imaging sensor array in the shutter open position, as shown in FIG. 6. The cover moves back and forth repeatedly between the closed and open positions thereby continuously covering and then exposing the imaging sensor array, while video is being captured by the imaging sensor array.

The shutter mechanism may be integrated within the housing of a consumer electronic device, such as a mobile phone, a digital camera, a webcam, or a laptop. Referring again to FIG. 3, the device may include the shutter mechanism 100, the imaging sensor array 150, a drive circuit 160, an image storage 180, a camera controller 170, an audio storage 190, and a microphone 192. The imaging sensor array 150 may be a CMOS imaging sensor array, as described in the background section, or alternatively a charge-coupled device (CCD) type imaging sensor array. The imaging sensor array 150 accumulates the light from a scene being imaged by the camera. The shutter mechanism 100 covers and exposes the sensor array 150 while the camera is capturing a video of the scene.

The reciprocating movement of a cover 120 may be controlled by a drive circuit 160. The drive circuit 160 may be electrically coupled to the rotary motor 135 and controls the rotation of the motor, including the speed at which the motor rotates a crank disk 110. The speed at which the crank disk 110 rotates determines the speed at which the cover 120 moves back and forth between the fully closed position and the fully open position to repeatedly cover and expose the imaging sensor array 150 and thus determines the frame rate at which video is captured by the imaging sensor array 150. In this embodiment, the revolutions per second of the crank disk 110 equates to the frames per second of the captured video.

The camera controller 170 may be a programmed processor or a hardwired state machine that is designed to perform typical camera functions. In this case, the camera controller 170 also synchronizes the readout of the sensor array 150 with the control of the rotary motor 135 by the drive circuit 160 to produce a video of the scene. To perform this function, the camera controller 170 may be electrically coupled to the drive circuit 160 and the imaging sensor array 150. The camera controller 170 may transmit motor control signals 164 to the drive circuit 160 to control the speed and direction of the rotary motor 135 corresponding to the desired video frame rate.

The camera controller 170 may transmit reset and column readout control signals 172 to the imaging sensor array 150. The imaging sensor array 150 resets each column of pixels to zero in response to the reset signal from the camera controller 170. When the imaging sensor array 150 receives the column readout control signal, the photogenerated image data is read out of the imaging sensor array 150 one column at a time and stored in the image storage 180. The image storage 180 may include nonvolatile solid state memory or a kinetic nonvolatile storage device (e.g., rotating magnetic disk drive) that stores the photogenerated image data.

The transmission of the reset and column readout control signals 172 is controlled by a cover position feedback signal 166 received by the camera controller 170. The camera controller 170 may receive the cover position feedback signal 166 from a rotary sensor (which may be coupled to the rotary motor or the crank disk) that determines the rotational position of the crank disk 110, which corresponds to the linear position of the cover 120. The camera controller 170 may alternatively receive the cover position feedback signal 166 from a linear sensor (which may be coupled to the guide 130) that determines the linear position of the cover 120.

The microphone 192 is an acoustic-to-electric sensor that converts sound into an electrical signal. Microphone 192 may be, for example, a dynamic microphone, a condenser microphone, or a piezoelectric microphone. The microphone 192 picks up the audible sound that is present while video is being captured by the imaging sensor array 150, which may include any acoustic noise that is produced by the shutter mechanism 100. At specific equal time intervals corresponding to the sampling rate of the sound recording, the analog sound signal picked up by the microphone 192 is converted to a digital signal. The digital signal (including other information such as the time stamp and sampling rate) is then transmitted to the audio storage 190. The audio storage 190 may include nonvolatile solid state memory or a kinetic nonvolatile storage device (e.g., rotating magnetic disk drive) that stores the audio data. The audio storage 190 may be on the same storage device as the image storage 180 or on a separate storage device.

The electronic operation of the device will now be described with reference to FIG. 3 through FIG. 7. When the cover 120 is completely covering the imaging sensor array 150 (FIG. 4) as indicated by the cover position feedback signal 166, the camera controller 170 sends the imaging sensor array 150 a reset signal. The imaging sensor array 150 resets each column of pixels to zero, starting with the right-most column of the imaging sensor array 150 until the last column (left-most column) is reset. Each column of the imaging sensor array 150 is reset before it is exposed by the cover 120. Once reset, the column is allowed to accumulate charge. When the imaging sensor array 150 is completely exposed as shown in FIG. 6, all of the columns have been reset and are now accumulating charge. When the cover 120 covers the left-most column of the imaging sensor array 150 as indicated by the cover position feedback signal 166, the camera controller 170 sends the imaging sensor array 150 a column readout signal. The imaging sensor array 150 will then transmit the photogenerated image data (including image information such as the time stamp and frame rate) to the image storage 180 starting with the left-most column of the imaging sensor array 150. Each column of the imaging sensor array 150 is readout immediately after it is covered by the cover 120 until the last column (right-most column) is read out. This process is repeated to capture video of a scene. In the above embodiment, the columns of imaging sensor array 150 are reset from right to left and read out from left to right. In the following embodiments, the columns of the imaging sensor array are reset and then read out in the same direction as they were reset.

Figure 8:
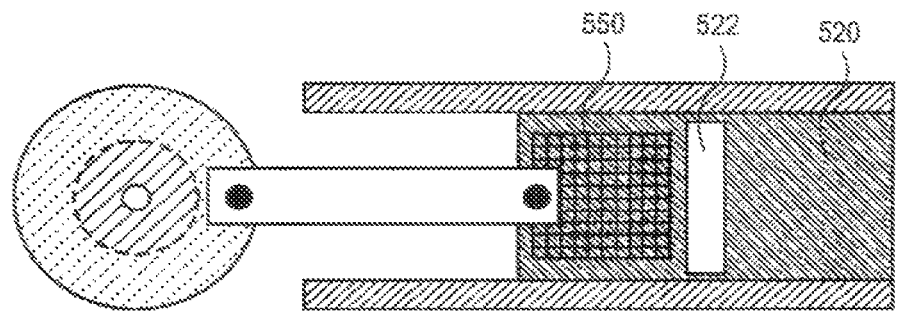
FIGS. 8-10 are a sequence of figures showing the movement of a camera shutter mechanism according to another embodiment.
Figure 9:
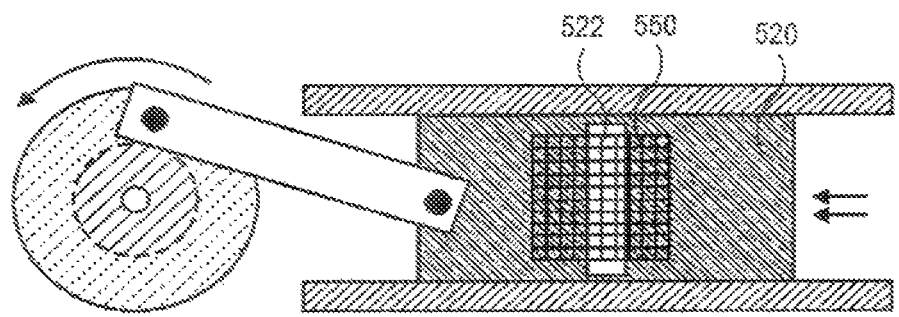
Figure 10:
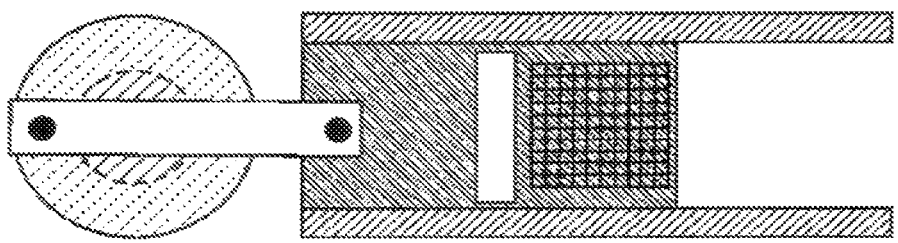

FIG. 8 through FIG. 10 show another embodiment of the invention. The cover 520 may be larger than twice the width of the imaging sensor array 550. The cover 520 may have a vertical slit or void 522 in the center of the cover that may be at least the height and width of one column of the imaging sensor array 550. The width of the slit 522 corresponds to the shutter speed. Faster shutter speeds require a narrower slit. The shutter is in the closed position and completely covers the imaging sensor array 550 when the cover 520 is either in the right-most position, as shown in FIG. 8, or the left-most position, as shown in FIG. 10. When the imaging sensor array 550 is completely covered, the first column to be exposed is reset followed by the next column to be exposed until the last column is reset. The vertical slit 522 travels horizontally across the imaging sensor array 550 as the cover 520 moves back and forth between the right-most closed position and the left-most closed position, as shown in FIG. 9. As the cover moves across the imaging sensor array 550, at least one column of the imaging sensor array is simultaneously exposed. As an exposed column is covered, the column is read out followed by the next column, after being covered, until the last column is read out. In this embodiment, half a revolution of the crank disk corresponds to one frame of the captured video.

Alternatively, this may be achieved using two separate covers coupled to a single crank disk. The covers may be coupled to each other in such a way so that their separation distance, and hence the width of the vertical slit moving across the imaging sensor array, is adjustable to allow for adjustable shutter speeds. The shutter speed of a camera may be varied by providing a user configurable option.

Figure 11:
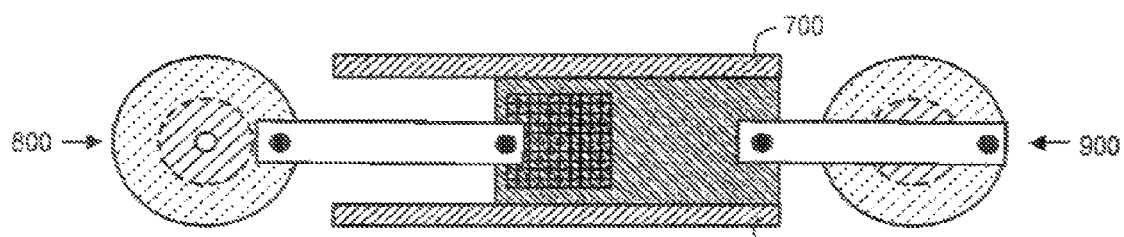
FIGS. 11-15 are a sequence of figures showing the movement of a camera shutter mechanism according to another embodiment where the shutter mechanism has two cover assemblies.
Figure 12:
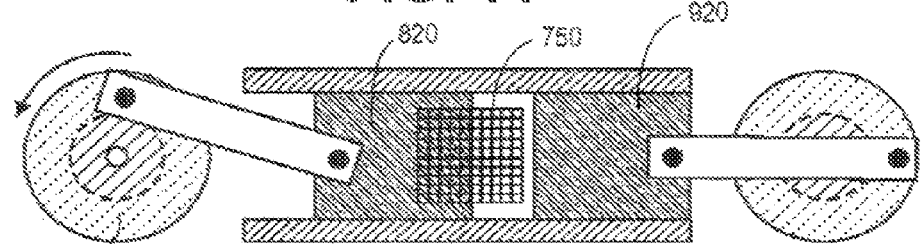
Figure 13:
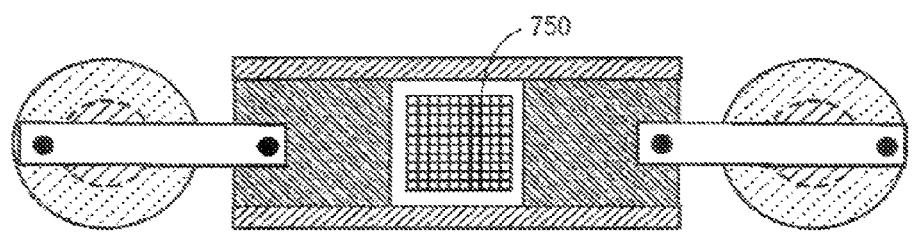
Figure 14:
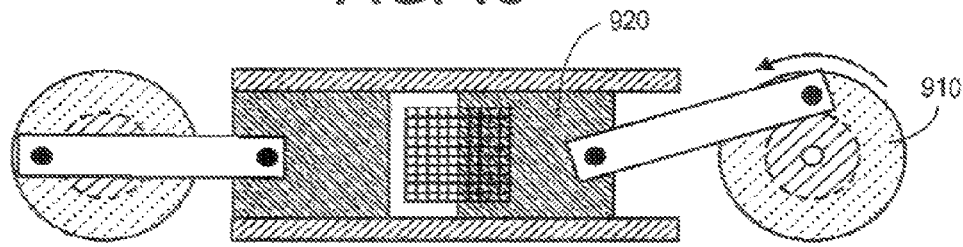
Figure 15:
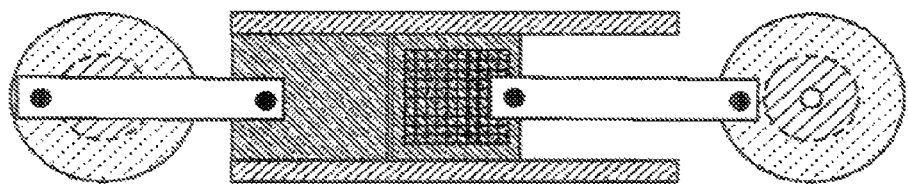

FIG. 11 through FIG. 15 show yet another embodiment of the camera shutter mechanism using two cover assemblies 800 and 900 that are similar to the cover assembly shown in FIG. 1. Each cover assembly may include a rotary motor, a crank disk, a connecting arm, and a cover. The two covers 820 and 920 move back and forth along a guide 700, similar to the guide of FIG. 1, to cover and expose an imaging sensor array 750. In FIG. 11, the shutter mechanism is in a first shutter closed position, and the imaging sensor array 750 is completely covered by the first cover 820. The first cover 820 moves to the left as the first crank disk 810 rotates to expose the imaging sensor array 750, as shown in FIG. 12. In FIG. 13, the shutter mechanism is in a shutter open position allowing the imaging sensor array 750 to be completely exposed to light. After the required amount of exposure, the second cover 920 moves to the left as the second crank disk 910 rotates, as shown in FIG. 14. In FIG. 15, the shutter mechanism is in a second shutter closed position, and the imaging sensor array 750 is completely covered by the second cover 920. Similarly, the covers 820 and 920 move to the right when the crank disks 810 and 910 are further rotated in the same direction to again expose and cover the imaging sensor array 750. The covers 820 and 920 move back and forth so as to completely cover the imaging sensor array 750 in the first and second shutter closed positions and to completely expose the imaging sensor array 750 in the shutter open position. This reciprocating motion of the covers is continuously repeated to capture a video of the scene. In this embodiment, half a revolution of the crank disk corresponds to one frame of the captured video.

Figure 16:
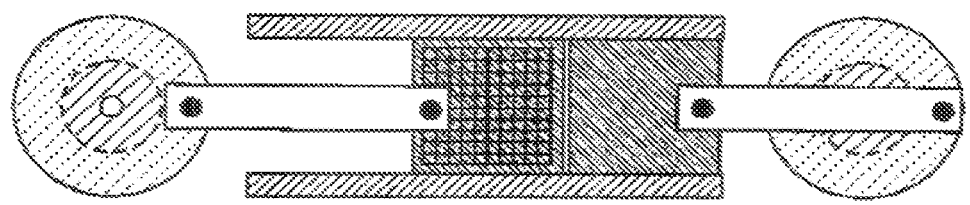
FIGS. 16-19 are a sequence of figures showing the movement of the camera shutter mechanism of FIGS. 11-15 when the shutter is operating in a fast shutter speed.
Figure 17:
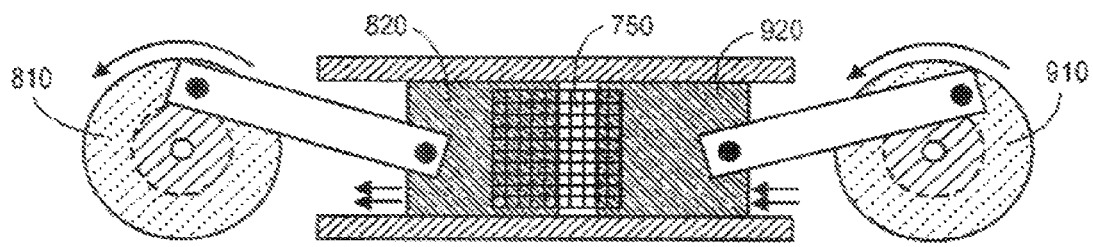
Figure 18:
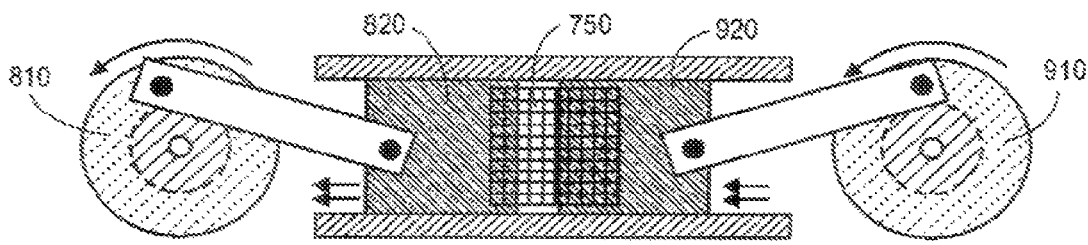
Figure 19:
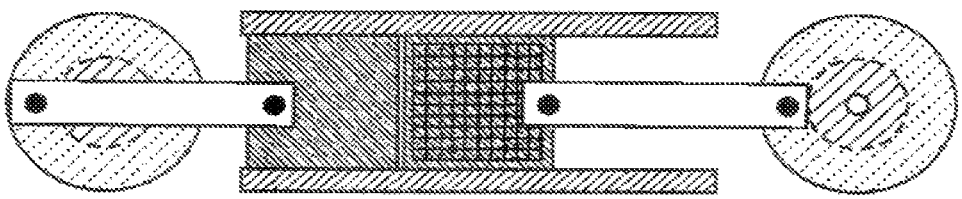

FIG. 16 through FIG. 19 depict the two cover assembly shutters operating in a fast shutter speed mode. The shutter speed of a camera may be varied by providing a user configurable option. In FIG. 16, the shutter mechanism is in the first shutter closed position, and the imaging sensor array 750 is covered by the first cover 820. The first crank disk 810 rotates to move the first cover 820 to the left allowing the imaging sensor array 750 to be partially exposed. The second crank disk 910 rotates to move the second cover 920 across the imaging sensor array 750 at a set distance from the first cover 820 allowing at least one column of the imaging sensor array 750 to be simultaneously exposed, as shown in FIG. 17. The distance between the covers 820 and 920 determines the shutter speed of the camera, with a smaller distance corresponding to a faster shutter speed. Both covers 820 and 920 continue to travel across the imaging sensor array 750 at the set distance, as shown in FIG. 18. The first cover 820 reaches its left-most position, followed closely by the second cover 920 which then completely covers the imaging sensor array 750 in the second shutter closed position, as shown in FIG. 19. Similarly, the covers 820 and 920 move to the right when the crank disks 810 and 910 are further rotated in the same direction to again expose and cover the imaging sensor array 750. The covers 820 and 920 move back and forth so as to completely cover the imaging sensor array 750 in the first and second shutter closed positions and to expose at least one column of the imaging sensor array 750 as the covers 820 and 920 move back and forth between the first shutter closed position and the second shutter closed position. This reciprocating motion of the covers is continuously repeated to capture a video of the scene.

For purposes of explanation, specific embodiments were described to provide a thorough understanding of the present invention. These should not be construed as limiting the scope of the invention but merely as illustrating different examples and aspects of the invention. It should be appreciated that the scope of the invention includes other embodiments not discussed in detail above. Various other modifications, changes, and variations which will be apparent to those skilled in the art may be made in the arrangement, operation, and details of the systems and methods of the present invention disclosed herein without departing from the spirit and scope of the invention as defined in the appended claims. For instance, while the figures show the crank disk 110 as being a circular disk, an alternative is to replace the crank disk with a crank arm. Therefore, the scope of the invention should be determined by the claims and their legal equivalents. Such equivalents include both currently known equivalents as well as equivalents developed in the future, i.e., any elements developed that perform the same function, regardless of structure. Furthermore, no element, component, or method step is intended to be dedicated to the public regardless of whether the element, component, or method step is explicitly recited in the claims.

What is claimed is:

1. A camera shutter mechanism, comprising:
a first cover assembly having a first rotary motor, a first crank mechanism coupled to the first rotary motor to be rotated by the first rotary motor about a central axis of the first crank mechanism, and a first cover coupled to the first crank mechanism at a point away from the central axis of the first crank mechanism, the first cover having an area at least as large as an imaging sensor array so as to completely cover the imaging sensor array when the first cover is in a first shutter closed position;
a second cover assembly having a second rotary motor, a second crank mechanism coupled to the second rotary motor to be rotated by the second rotary motor about a central axis of the second crank mechanism, and a second cover coupled to the second crank mechanism at a point away from the central axis of the second crank mechanism, the second cover having an area at least as large as the imaging sensor array so as to completely cover the imaging sensor array when the second cover is in a second shutter closed position;
a guide to support the first cover and the second cover, the guide restricts the first cover and the second cover to a substantially linear motion; and
a drive circuit to control the first rotary motor and the second rotary motor so that the first cover and the second cover move back and forth repeatedly to cover and expose the imaging sensor array.

2. The camera shutter mechanism of claim 1 wherein the first cover and the second cover move back and forth so as to completely cover the imaging sensor array in the first and second shutter closed positions and to completely expose the imaging sensor array in a shutter open position.

3. The camera shutter mechanism of claim 1 wherein the first cover and the second cover move back and forth so as to completely cover the imaging sensor array in the first and second shutter closed positions and to expose at least one column of the imaging sensor array as the first cover and the second cover move back and forth between the first shutter closed position and the second shutter closed position.

4. The camera shutter mechanism of claim 1 wherein the drive circuit causes the first rotary motor to rotate in one direction and the second rotary motor to rotate in the same direction as the first rotary motor so as to continuously expose and cover the imaging sensor array, while a video is captured by the imaging sensor array.

5. The camera shutter mechanism of claim 1 wherein the first rotary motor is directly coupled to the first crank mechanism by a first motor shaft, and the first crank mechanism is coupled to the first cover by a first connecting arm.

6. The camera shutter mechanism of claim 1 wherein the second rotary motor is directly coupled to the second crank mechanism by a second motor shaft, and the second crank mechanism is coupled to the second cover by a second connecting arm.

7. A camera comprising:
an imaging sensor array on which light from a scene being imaged by the camera is impinged;
a cover assembly having a rotary motor, a crank mechanism coupled to the rotary motor to be rotated by the rotary motor about a central axis of the crank mechanism, and a single cover coupled to the crank mechanism at a point away from the central axis of the crank mechanism, the single cover having an area at least as large as an imaging sensor array so as to completely cover the imaging sensor array when the single cover is in a shutter closed position;
a guide to support the single cover and restrict the single cover to a substantially linear motion;
a drive circuit to control the rotary motor so that the single cover moves back and forth repeatedly to cover and expose the imaging sensor array; and
a camera controller to synchronize readout of the imaging sensor array with the control of the rotary motor by the drive circuit to produce a video of the scene.

8. The camera of claim 7 wherein the drive circuit causes the rotary motor to rotate in one direction so as to continuously expose and cover the sensor array, while a video is captured by the imaging sensor array.

9. The camera of claim 7 further comprising an additional cover assembly having an additional rotary motor, an additional crank mechanism coupled to the additional rotary motor to be rotated by the additional rotary motor about a central axis of the additional crank mechanism, and an additional cover coupled to the additional crank mechanism at a point away from the central axis of the additional crank mechanism, the additional cover having an area at least as large as the imaging sensor array so as to completely cover the imaging sensor array when the additional cover is in an additional shutter closed position.

10. The camera of claim 9 wherein the cover and the additional cover move back and forth along the guide so as to completely cover the imaging sensor array in the shutter closed position and the additional shutter closed position and to completely expose the imaging sensor array in a shutter open position.

11. The camera of claim 9 wherein the cover and the additional cover move back and forth along the guide so as to completely cover the imaging sensor array in the shutter closed position and the additional shutter closed position and to expose at least one column of the imaging sensor array as the cover and the additional cover move back and forth between the shutter closed position and the additional shutter closed position.

12. The camera of claim 9 wherein the drive circuit causes the second rotary motor to rotate in the same direction as the rotary motor so as to continuously expose and cover the imaging sensor array, while a video is captured by the imaging sensor array.

13. The camera of claim 9 wherein the second rotary motor is directly coupled to the additional crank mechanism by an additional motor shaft, and the additional crank mechanism is coupled to the additional cover by an additional connecting arm.

14. The camera of claim 7 wherein the rotary motor is directly coupled to the crank mechanism by a motor shaft, and the crank mechanism is coupled to the cover by a connecting arm.

15. The camera shutter mechanism of claim 1, wherein the camera shutter mechanism comprises a focal plane shutter.

16. The camera shutter mechanism of claim 1, wherein the drive circuit is configured to repeatedly cover and expose the imaging sensor array while video is being captured by the imaging sensor array.

17. The camera shutter mechanism of claim 1, wherein the cover assembly and the additional cover assembly are configured to leave a slit opening to expose the imaging sensor array, wherein the slit opening has a width that is less than a width of the imaging sensor array.

18. The camera shutter mechanism of claim 17, wherein the width of the slit opening is adjustable for adjustable shutter speeds.

19. The camera of claim 9, wherein the cover assembly and the additional cover assembly are configured to leave a slit opening to expose the imaging sensor array, wherein the slit opening has a width that is adjustable for adjustable shutter speeds.

20. The camera of claim 9, wherein the cover assembly and the additional cover assembly form a focal plane shutter.

* * * * *